United States Patent [19]

Klüting

[11] 4,252,369
[45] Feb. 24, 1981

[54] DEVICE FOR ARRESTING A BACKREST OF A VEHICLE SEAT

[75] Inventor: Bernd Klüting, Radevormwald, Fed. Rep. of Germany

[73] Assignee: Keiper Automobiltechnik GmbH & Co. KG, Remscheid, Fed. Rep. of Germany

[21] Appl. No.: 9,696

[22] Filed: Feb. 5, 1979

[30] Foreign Application Priority Data

Feb. 17, 1978 [DE] Fed. Rep. of Germany ....... 2806771

[51] Int. Cl.³ ............................................... B60N 1/04
[52] U.S. Cl. ........................................ 297/379; 292/210
[58] Field of Search ............... 297/379, 328, 366–368; 292/210, 108; 16/146, 139

[56] References Cited

U.S. PATENT DOCUMENTS

| | | | |
|---|---|---|---|
| 3,305,258 | 2/1967 | Peters | 292/210 X |
| 3,384,404 | 5/1968 | Slattery | 292/210 X |
| 3,410,600 | 11/1968 | Thorpe | 297/379 X |
| 3,635,525 | 1/1972 | Magyar | 297/379 X |

FOREIGN PATENT DOCUMENTS

| | | | |
|---|---|---|---|
| 1555857 | 7/1970 | Fed. Rep. of Germany | 297/379 |
| 2326808 | 12/1973 | Fed. Rep. of Germany | 292/210 |
| 2514819 | 10/1976 | Fed. Rep. of Germany | 297/379 |
| 2441398 | 11/1976 | Fed. Rep. of Germany | 297/379 |

*Primary Examiner*—William E. Lyddane
*Attorney, Agent, or Firm*—Michael J. Striker

[57] ABSTRACT

The arresting device for a forwardly inclinable backrest of a vehicle seat comprises a hook-shaped pawl which is pivotably arranged on a lateral side of hinged mounts for the backrest to engage in the normal position of the backrest a stop member projecting from the seat part. The lower arm of the U-shaped porton of the pawl is provided with a claw which in this normal position engages a corresponding nose of a retaining member which is also pivotably supported on the mounting part and is controlled by a manually operable releasing lever. A tension spring arranged between the pawl and the retaining member urges the pawl into a standby position when the latter is released from engagement with the holding member and also urges the holding member into a ready-to-close position.

7 Claims, 4 Drawing Figures

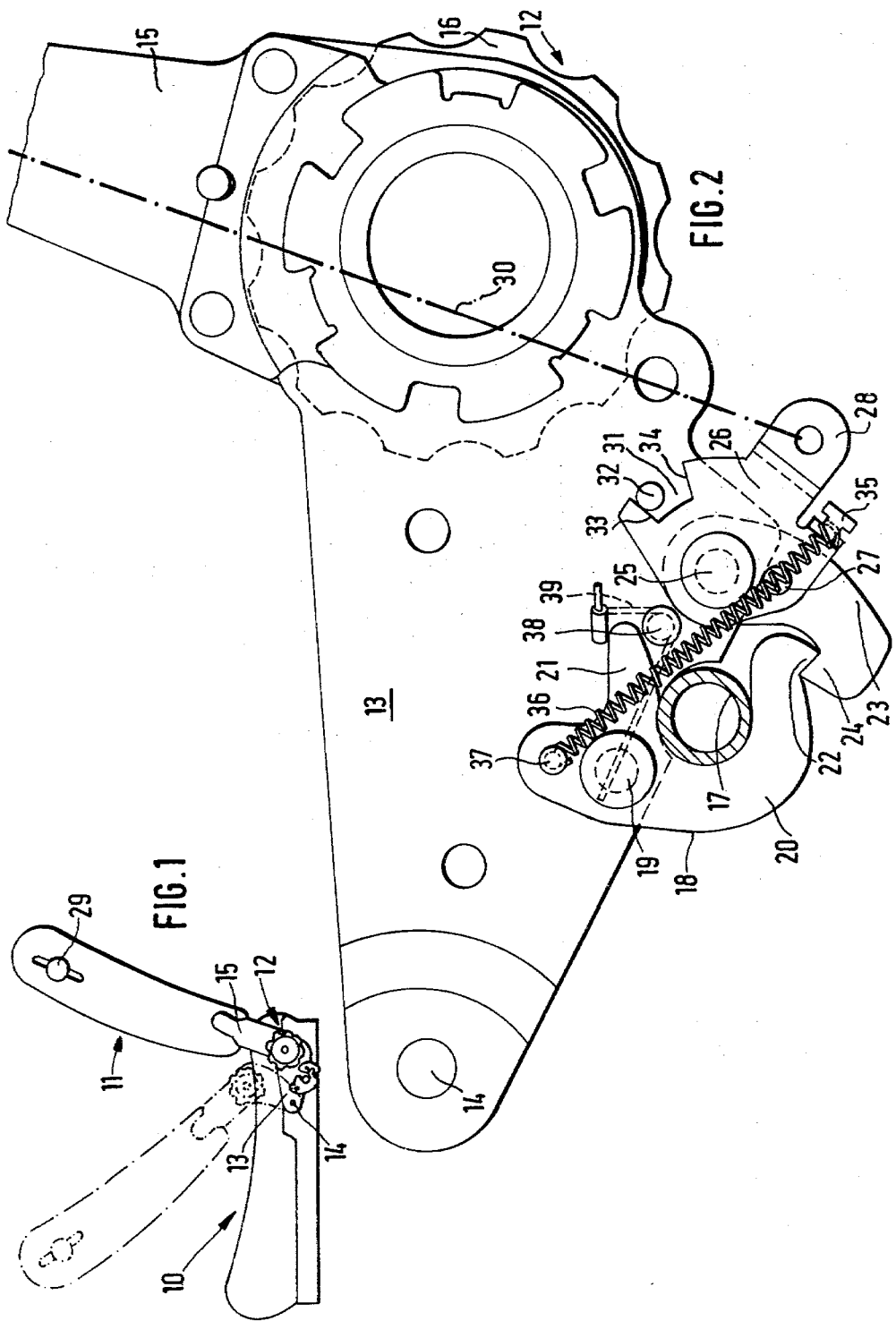

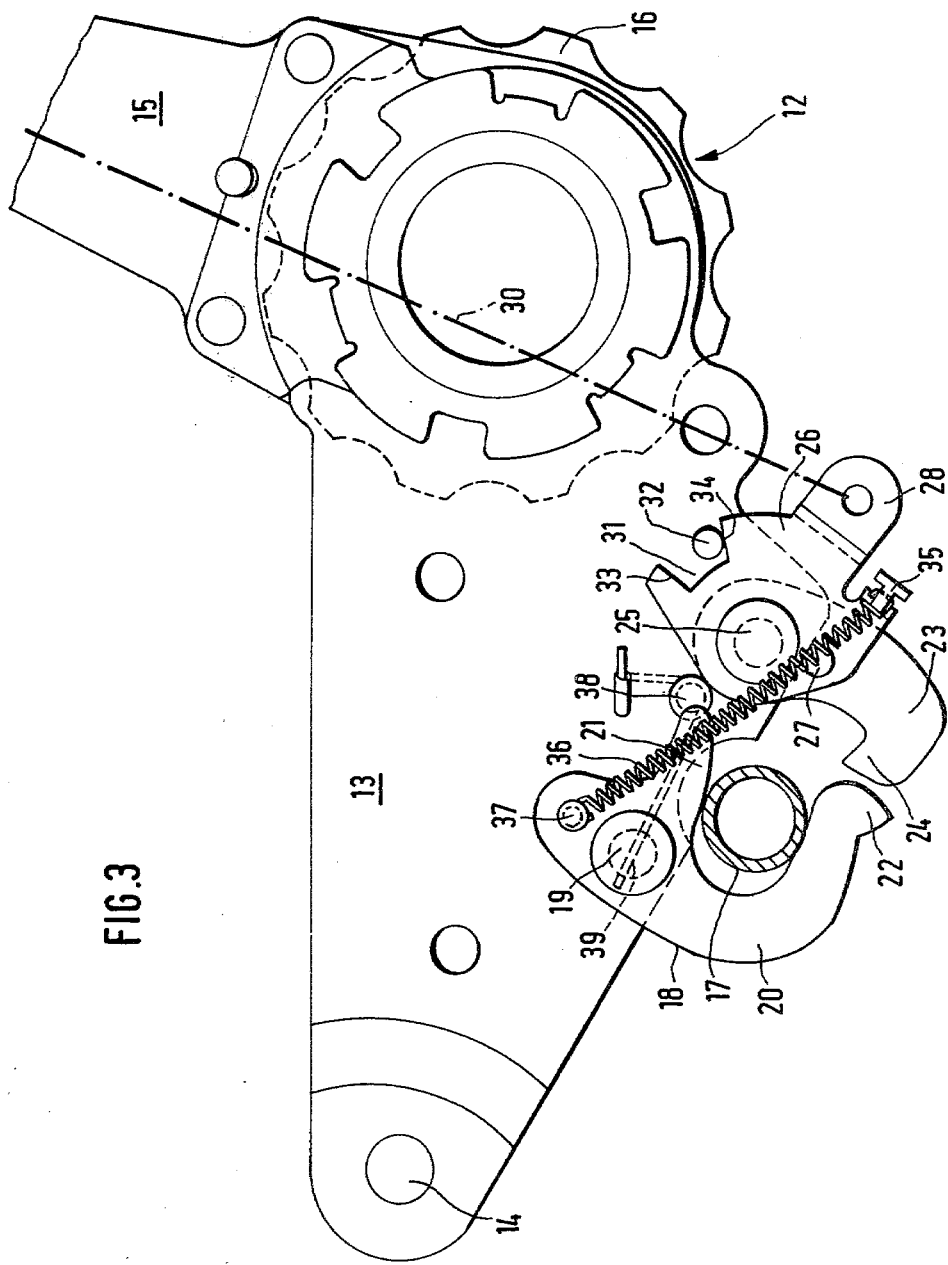

DEVICE FOR ARRESTING A BACKREST OF A VEHICLE SEAT

BACKGROUND OF THE INVENTION

This invention relates generally to reclinable vehicle seats, and more particularly it relates to a device for a releasable arresting of a forwardly tiltable backrest of a vehicle seat. The arresting device is of the type which includes an arresting pawl pivotably supported on the seat part of the vehicle seat and engaging from behind a stationary stop connected to the seat part and being releasable from its arresting position if desired.

In a known vehicle seat, an angularly adjustable and arrestable hinged mount is arranged between the backrest and the seat part. The hinged mount part assigned to the seat part is pivotably supported on pins projecting from the seat part, whereby the other hinged mount part is rigidly connected to the backrest so that the entire hinged mount unit together with the backrest is tiltable about the pin. In the normal operative position of the backrest, the lower edge of the hinged part which is pivotably connected to the seat part bears against a stop member such as a tubular member transversing the seat part or its carrier, for example. In this manner the forces occurring during the normal usage of the seat, that means the pressures acting against the backrest part opposite the travel direction are intercepted. In order to safeguard the backrest against unintentional forward tilting, for example in case of a collision, the hinged mount part pivotably connected to the seat part is secured in its normal position by means of an arresting pawl which is hinged to the pivotable mount. This locking or arresting pawl during the normal use of the vehicle seat engages from behind a peripheral portion of the stop member which is located opposite the contact zone of the lower hinged mount. The arresting pawl defines a mouth having negatively sloping starting surfaces which enable both the free pivotable movement of the arresting pawl and its transition into a locking or an arresting position. Nonetheless, in order to prevent an unintentional releasing of the arresting pawl, the rear side of the latter opposite the bottom of its mouth is counteracted by a reinforcing cam which is pivotably supported on a pin attached to the hinged mount part connected to the seat part. A cam follower which can also be tiltably supported on the same pin as the reinforcing cam is coupled to this cam. The cam follower is spring loaded and is controllable by means of a Bowden wire and, by means of a shiftable handle arranged on the backrest, can be tilted into a released position. Since the load of the arresting pawl corresponds to that of the unilaterally clamped support, the vertical dimension of the section of the arresting pawl which is susceptible to breakage has to be dimensioned such as to withstand excessive loads and consequently a too large size of this pawl results. Moreover, too many components have to be employed for creating the arresting pawl which is capable of assuming its ready-to-close position when it is in its released position and which is reinforced in its arresting position.

SUMMARY OF THE INVENTION

It is, therefore, a general object of the present invention to overcome the aforementioned disadvantages.

More particularly, it is an object of the invention to provide an improved device for a releasable arresting of a safety or arresting pawl for a hinged backrest of a vehicle seat in which the sectional size of the pawl is substantially reduced and consequently requires substantially less material.

Another object of this invention is to provide such an improved arresting device which requires fewer component parts than conventional devices of this type and which can be economically manufactured.

Still another object of this invention is to provide such an improved arresting pawl which in its arresting position is reinforced from different sides.

In keeping with these objects, and others which will become apparent hereafter, one feature of the invention resides in the provision of a hook-shaped holding member pivotably mounted on the hinged mount, the holding member being engageable with a retaining claw of the hook-shaped pawl which is also tiltably mounted on the hinged mount at the opposite side of the stop member projecting from the seat. In this manner, it is assured that the loading conditions of the arresting pawl are similar as if the backrest carrying member were reinforced by two supports. Accordingly, the arresting pawl arranged in accordance with this invention can be dimensioned to be weaker than conventional pawls of this type. In addition, in order to facilitate the engagement of the stop member with the hook-shaped arresting pawl, the mouth of the latter has a negatively curved, outwardly increasing introduction region. Due to the positively defined engagement of the tip claw of the pawl with the holding member, the pawl is held in its arresting position on the stop member irrespective from the frictional moment normally securing this arresting position.

In the preferred embodiment of this invention, a reliable holding of the hook-shaped arresting pawl in its engaged position with the stop member is attained by shaping the tip of the outer arm of the hook as a claw which engages the correspondingly shaped nose on the holding member when the latter is in its arresting position.

In order to facilitate the releasing of the arresting pawl from its engagement with the stop member when the backrest is to be tilted forwardly, and on the other hand in order to enable to hold the arresting pawl in a ready-to-arrest position during the tilting movement of the backrest, the arresting pawl has, according to still another feature of this invention, a projecting finger which in the open position of the arresting pawl rests on the stop member, whereby the arresting pawl is spring-biased towards its open position and the hook-shaped holding member is spring-biased towards its closing position. The holding member is brought into its releasing position by means of a manually operated releasing lever.

In order to uniformly distribute the holding forces acting against the arresting pawl, the latter is pivotably supported on the mount opposite one side of the stop member when viewed in the longitudinal direction of the seat and the holding member together with the releasing lever are arranged on the lower hinged mount of the backrest on the other side of the stop member.

According to still another feature of this invention, the ready-to-close or the standby position of the arresting pawl is achieved by very simple means, in such a manner that the biasing spring for the pawl and for the holding member is a spiral spring extending between one arm of the pawl and the releasing lever for the holding member.

The aforedescribed arresting device of this invention, can be arranged on a mount in the form of a fish plate rigidly connected to the backrest and tiltably supported on the seat part. It is advantageous, however, when an adjustable and arrestable two-piece hinged mount is employed between the seat part and the backrest part of the vehicle seat. This hinged mount has an upper mount part which is rigidly connected to the backrest and a lower mount part pivotably supported from the latter. In this case for tilting the backrest together with the articulated hinged parts which are locked together to form a rigid mount unit, the arresting pawl is pivotably arranged on one pivot pin, whereas the holding member and the releasing lever are supported for pivotal movement on another pivot pin on the lower mount part.

According to still another feature of this invention, the pivot pin of the arresting pawl is spring loaded by a resilient element secured to the lower hinged mount so that in the case when the adjoining seat is unoccupied and its backrest is unloaded, any rattling noises resulting from the manufacturing tolerances of the device of this invention are eliminated.

In order to prevent excessive strain of the spring between the arresting pawl and the holding member and also to define the ready-to-close position of the pawl when the backrest is tilted forwardly, the closing position, as well as the releasing position of the holding member, the pivotal movement of the latter is limited by two stop surfaces provided in a recess in the releasing lever.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows schematically a side view of a vehicle seat including the arresting device of this invention;

FIG. 2 shows on an enlarged scale the hinged mount of the backrest of FIG. 1 including on its lower hinged mount part the arresting device;

FIG. 3 shows the position of the arresting device of FIG. 2 immediately after its release by a releasing lever.

DESCRIPTION OF THE PREFERRED EMBODIMENTS

Figure 4:
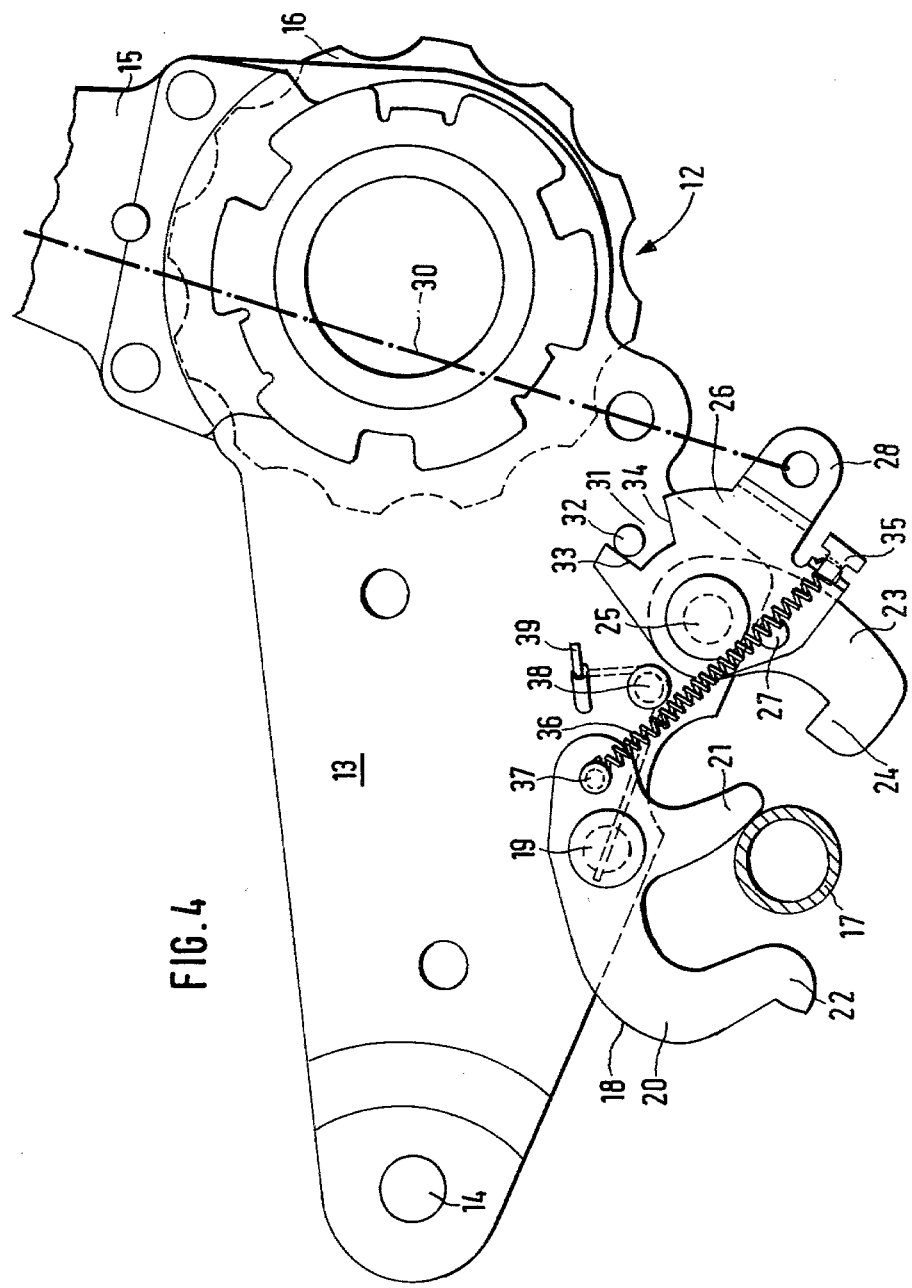
FIG. 4 is the arresting device of FIGS. 2 and 3 in its fully open position in which forward tilting of the backrest is possible.

The motor vehicle seat as illustrated by way of an example in FIG. 1 consists of a seat part 10 and a backrest 11. On each side of the seat between the seat part 10 and the backrest 11 there is arranged a hinged mount 12 having a lower mount part 13 which is pivotably supported on a pin 14 fixed to the seat part 10, whereas the upper mount part 15 is fixedly connected to the backrest 11. The lower mount part 13 and the upper mount part 15 are tiltably connected one to the other. The mutual position of the two mount parts is determined by means of an adjusting and arresting device which can be in the form of wobble gears for example; controlled, for example, by means of a manipulation handle 16.

Backrest 11 is tiltable forwardly above the seat part 10 so that particularly in the case of two-door motor vehicles, the user has an easier access to the rear compartment of the vehicle. This access is preferably made without changing the reclined position of backrest 11 adjusted by means of the aforementioned adjusting and arresting device on the upper mount part 12 so that the backrest upon its return into its normal position has the same inclination and need not be readjusted by means of manipulating handle 16. For this reason, both mount parts are rigidly held together by means of the arresting mechanism of the adjustment device to form a rigid unit 12 which is tiltable together with the backrest 11 about pivot pin 14 projecting from the supporting frame of the seat part 10. In the operative position of backrest 11 the lower edge of the lower mount part 13 rests on a stop member 17 which is fixedly mounted to the seat part 10 and has preferably the form of a tubular piece arranged transversely to the frame or carrying structure of the seat. To prevent unintentional forward tilting of backrest 11, a hook-shaped arresting pawl 18 is provided which is pivotably supported on a pivot pin 19 on the lower mount part 13. The pivot 19 in the lower mount part 13 is situated in the range between the pivot pin 14 for pivotably supporting the lower mount part 13 and the stop member 17, that means it projects immediately in front of the stop member 17. The arresting pawl 18 defines a hook-shaped or U-shaped portion defining a lower arm 20. This U-shaped portion engages the stop member 17 in such a manner that it is swingable in rearward direction to attain its arresting position. The other arm of the U-shaped portion of arresting pawl 18 forms a projecting finger 21 exceeding the top part of stop member 17 so that the finger 21 together with arm 20 form the arms of the U-shaped portion or the mouth of the arresting pawl 18. The free end of lower arm 20 is shaped into a retaining claw 22 which in the arresting position of the pawl 18 is in engagement with a corresponding nose 24 of a safety hook 23 functioning as a holding member for the arresting pawl. The safety hook 23 is also pivotably supported on an axial pin 25 projecting through lower mount parts 13. The pivot pin 25, however, is supported on mount part 13 behind the stop member 17. Pivot pin 25 also pivotally supports a releasing lever 26 which is fixedly secured to safety hook 23 by means of a connecting pin 27. The releasing lever 26 is provided with a manipulation arm 28 which is operatively coupled by means of a Bowden wire 30, for example, to a control lever 29 arranged at the upper part of the backrest 11. In addition, the releasing lever 26 has at its upper section a recess 31 surrounding a stop pin 32 projecting from the lower mount part 13 and limiting by its stop surfaces 33 and 34 which cooperate with the stop pin 32, the travel of the safety or retaining hook 23. Below the pivot pin 25 of the hook 23 there is provided an abutment 35 secured to one end of a spring 36 which urges the releasing lever 26 together with the safety hook 23 in closing direction. The arresting pawl 18 has also above its pivot pin 19 a mounting pin 37 to which the other end of the spring 36 is fastened. In the illustrated exemplary embodiment the same spring 36 biases both the abutment 35 of the releasing lever 26 and the mounting pin 37 of the arresting pawl 18. Spring 36 in this case is in the form of a spiral spring. An additional bearing pin 38 is arranged between pivot pins 19 and 25 projecting from the lower mount part 13. The bearing pin 38 supports a spring element 39 which is preferably in the form of a torsional coil spring, one free arm of which rests on the lower mount part 13 and the other arm thereof bearing against the pivot pin 19 to eliminate rattling noises of the arresting mechanism which may be caused by the play resulting from manufacturing tolerances for example.

In the closed or arresting position of arresting pawl 18, as illustrated in FIG. 2, the retaining hook 23 secures the arresting position of the pawl 18 in which its U-shaped mouth is in contact with stop member 17. Upon the actuation of control lever 29 upwardly, the releasing lever 26 together with the retaining hook 23 are rotated counterclockwise via the Bowden wire 30 to a point at which the stop surface 34 of releasing lever 26 abuts against the stop pin 32 (FIG. 2). In this position nose 24 of retaining hook 23 is disengaged from retaining claw 22 of pawl 18 so that the tensioning spring 36 rotates the pawl 18 clockwise. This initial phase of the releasing movement of arresting pawl 18 is illustrated in FIG. 3. The tension spring 36 keeps pawl 18 turning clockwise until the pawl takes a standby position as illustrated in FIG. 4. During the clockwise turning of the pawl, prior to the forward tilting of the hinged mount 12 together with backrest 11, the finger 21 of pawl 18 slides on the upper surface of tubular stop member 17, whereas the claw 22 of arm 20 is displaced upwardly at a distance from the stop 17. As a result, this standby position makes it possible to tilt backrest 11 together with hinged mounts 13 and 15 about pivot pin 14 in forward direction above the seat part 10. Upon releasing operating lever 29, tension spring 36 urges releasing lever 26 together with the retaining hook 23 clockwise to resume their initial position in which stop surface 33 of releasing lever 26 abuts against stop pin 32. Retaining hook 23 resumes again its ready-to-close position. Now, if backrest 11 with its hinged mount 12 is tilted from its forwardly inclined position indicated by dash-dot lines in FIG. 1 into its normal position, it is the projecting finger 21 which first contacts stop member 17. The contact edge of finger 21 is shaped so as to urge pawl 18, in the course of the further downward movement of the lower mount part 13, counterclockwise upwardly until its U-shaped portion abuts against the stop member 17 and claw 22 displaces the spring-biased retaining hook 23 and snaps into engagement with its nose 24, thus resuming its arresting position as illustrated in FIG. 2. As mentioned above, in this arresting position the retaining hook 23 insures again a reliable arresting function of pawl 18 and only upon the repeated actuation of operating lever 29 the pawl can be released again.

It will be understood that each of the elements described above, or two or more together, may also find a useful application in other types of constructions differing from the types described above.

While the invention has been illustrated and described as embodied in an arresting device for the reclinable backrest of a vehicle seat, it is not intended to be limited to the details shown, since various modifications and structural changes may be made without departing in any way from the spirit of the present invention. For example, instead of a pivotable support of arresting pawl 18 and of retaining hooks 23, it is also possible to employ a sliding support in a bearing slot. Moreover, the location of pawl 18 and hook 23 can be interchanged so that hook 23 is in front of and pawl 18 is behind the stop member 17.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A releasable arresting device for a forwardly inclinable backrest of a vehicle seat, comprising a stop member projecting laterally from the seat; a hook-shaped pawl pivotally arranged on the backrest and having two projecting arms forming a recess therebetween to engage one side of said stop member when the backrest is in its normal position, one of said arms being terminated with a claw, the other arm of said pawl having an elongated finger which rests on said stop member in the standby position while said one arm is spaced apart from the stop member; a hook-shaped retaining member pivotally arranged on the backrest opposite the other side of said stop member and having a corresponding nose for engaging said claw when said pawl is in engagement with said stop member; means for releasing said retaining member from said pawl; and spring means coupled to said pawl for urging the same into a standby position in which it is disengaged from said stop member to permit forward tilting of said backrest, said spring means being further coupled to said retaining member to urge the same into a ready to close position when said means for releasing said retaining member are released.

2. The device as defined in claim 1, wherein said control means includes a manually operated releasing member connected to said retaining member.

3. The device as defined in claim 2, wherein said releasing member includes a recess defining two stop surfaces cooperating with a projection of said lower mount part to limit the travel of said retaining member.

4. The device as defined in claim 2, wherein the backrest includes mounting means pivotably supported on lateral sides of the seat part, said pawl being pivotably supported on said mounting means behind said arresting member when viewed in the longitudinal direction of the vehicle seat, and said retaining member together with said releasing lever being pivotably supported on said mounting means in front of said arresting member.

5. The device as defined in claim 4, wherein said mounting means is assembled of a lower mount part secured to the seat part and an upper mount part secured to the backrest, the two mount parts being arrestably hinged one to another and said lower mount part being pivotably supported on a lateral side of the seat part, said arresting pawl and said retaining member together with the releasing lever being pivotably supported on corresponding pivot pins projecting from said lower mount part.

6. The device as defined in claim 5, further including an additional spring element supported on said lower mount part and loading said arresting pawl to eliminate noises resulting from backlash of said pawl on said pivot pin.

7. The device as defined in claim 1, wherein said spring means is a tension spring connected between said pawl and said retaining member.

* * * * *